United States Patent [19]

Boersma et al.

[11] 4,234,412
[45] Nov. 18, 1980

[54] PROCESS FOR UPGRADING OF FISCHER-TROPSCH PRODUCTS

[75] Inventors: Michael A. M. Boersma; Swan T. Sie, both of Amsterdam, Netherlands

[73] Assignee: Shell Oil Company, Houston, Tex.

[21] Appl. No.: 39,247

[22] Filed: May 15, 1979

[30] Foreign Application Priority Data

May 22, 1978 [NL] Netherlands ............... 7805494

[51] Int. Cl.³ ............................................. C10G 59/06
[52] U.S. Cl. ......................................... 208/80; 208/92; 208/950; 252/449; 252/459
[58] Field of Search ..................... 208/92, 950, 80

[56] References Cited

U.S. PATENT DOCUMENTS

| | | | |
|---|---|---|---|
| 3,700,585 | 10/1972 | Chen et al. | 208/111 |
| 3,758,403 | 9/1973 | Rosinski et al. | 208/120 |
| 3,893,906 | 7/1975 | Garwood et al. | 208/111 |
| 3,894,939 | 7/1975 | Garwood et al. | 208/111 |
| 4,041,094 | 8/1977 | Kuo et al. | 208/120 X |
| 4,041,096 | 8/1977 | Kuo | 208/120 X |
| 4,041,097 | 8/1977 | Ireland et al. | 208/120 X |
| 4,044,063 | 8/1977 | Ireland et al. | 208/120 X |
| 4,045,505 | 8/1977 | Ireland et al. | 208/141 X |
| 4,046,829 | 9/1977 | Ireland et al. | 208/120 X |
| 4,071,574 | 1/1978 | Milstein et al. | 208/120 X |

FOREIGN PATENT DOCUMENTS 7613957 12/1977 Netherlands ............... 423/328

OTHER PUBLICATIONS

McNicol et al., "Spectroscopic Studies of Zeolite Synthesis", Journal of Physical Chemistry, 78 (23) 1972.

Primary Examiner—Delbert E. Gantz
Assistant Examiner—G. E. Schmitkons
Attorney, Agent, or Firm—Ronald R. Reper

[57] ABSTRACT

A process for upgrading of Fischer-Tropsch hydrocarbon synthesis product which comprises separating said product with at least one of a light boiling fraction and/or heavy boiling fractions and contacting said fraction(s) with certain crystalline silicates to obtain an aromatic gasoline and/or a fuel oil having a lowered pour point.

8 Claims, No Drawings

PROCESS FOR UPGRADING OF FISCHER-TROPSCH PRODUCTS

BACKGROUND OF THE INVENTION

The invention relates to a process for the upgrading of a reaction product obtained in the hydrocarbon synthesis according to Fischer-Tropsch.

In view of the increasing need of liquid hydrocarbon distillates such as gasolines, kerosenes, and gas oils and the decreasing reserves of mineral oil, there is a great interest in processes permitting the conversion, in an economically justified way, of carbon-containing materials not based on mineral oil, such as natural gas and coal, into the above-mentioned liquid hydrocarbon distillates. It is known that carbon-containing materials, such as natural gas and coal can be converted into mixtures of carbn monoxide and hydrogen. It is further known that mixtures of carbon monoxide and hydrogen can be converted into a reaction product containing hydrocarbons and oxygen-containing hydrocarbons by contacting the mixtures at an elevated temperature with a suitable catalyst. In this so-called hydrocarbon synthesis according to Fishcher-Tropsch, a reaction product is obtained in which the hydrocarbons show a very wide spread in carbon number. From the reaction product hydrocarbon mixtures may be separated, the boiling range of which is the same as those of gasolines, kerosenes, and gas oils. A drawback of the reaction product obtained in the hydrocarbon synthesis according to Fischer-Tropsch is that the hydrocarbons present therein are substantially unbranched paraffins. Because of the high content of unbranched paraffins, the hydrocarbon mixtures which may be separated from the reaction product are not very suitable as motor gasolines since they have a low octane number and also not very suitable as fuel for jet engines and diesel engines since they have a high pour point. With regard to the above-mentioned applications, a second drawback of the Fischer-Tropsch reaction product is that it consists to a considerable extent of components boiling below the gasoline range. Finally, the hydrocarbon synthesis according to Fischer-Tropsch has the drawback that part of the mixture of carbon monoxide and hydrogen is converted into oxygen-containing hydrocarbons which are ineligible for the above-mentioned applications.

An investigation by the present applicant concerning the upgrading of a reaction product obtained in the hydrocarbon synthesis according to Fischer-Tropsch has shown that a solution to the above problems can be found by subjecting certain fractions of the reaction product to a conversion using, as the catalyst, certain crystalline silicates which have recently been synthesized for the first time as described in Netherland patent application No. 7,613,957 incorporated herein by reference. It has been found that a considerable upgrading of the fractions concerned is achieved by contacting certain fractions of the reaction product at an elevated temperature with a catalyst which contains one of these crystalline silicates. When the conversion is applied to a light fraction which boils substantially in the gasoline range, an aromatic motor gasoline is obtained. When the conversion is applied to a heavy fraction which boils substantially above the gasoline range, a fuel with a low pour point is obtained. It has further been found that the catalysts are capable of converting a light fraction of the reaction product which boils substantially below the gasoline range into an aromatic motor gasoline. Finally, it has been found that the catalysts are capable of converting oxygen-containing hydrocarbons that are present in the reaction product into hydrocarbons.

SUMMARY OF THE INVENTION

The present invention therefore relates to a process for upgrading a Fischer-Tropsch hydrocarbon synthesis reaction product which comprises separating from said reaction product at least one of:
(a) a light fraction consisting substantially of gaseous and/or liquid components boiling at a temperature below about 250° C., and
(b) a heavy fraction, a major portion of which has an atmospheric boiling point above 200° C.; and, connecting at least one of said light and heavy fractions at a temperature in the range from about 200° to about 550° C., a pressure below 100 bar and a space velocity in the range from about 0.1 to about 50 $1.1^{-1}.h^{-1}$ with a catalyst containing a crystalline silicate which
(i) is thermally stable to temperatures above 600° C.,
(ii) after dehydration at 400° C. in vacuum, is capable of adsorbing more than 3%w water at 25° C. and saturated water vapor pressure, and
(iii) in dehydrated form, has the following overall composition, expressed in moles of the oxides:
$(1.0\pm0.3)(R)_{2/n}O.[a\ Fe_2O_3.b.Al_2O_3.cGa_2O_3]. y(d\ SiO_2.eGeO_2)$, where:
R = one or more mono or bivalent cations,
$a \geq 0.1$,
$b \geq 0$,
$c \geq 0$,
$a+b+c=1$,
$y \geq 10$,
$d \geq 0.1$,
$e \geq 0$,
$d+e=1$, and
n = the valency of R,
whereby in the case of said light fraction, an aromatic gasoline product is obtained and in the case of said heavy fraction, a fuel oil product having a lower pour point than that of said heavy fraction is obtained.

DESCRIPTION OF PREFERRED EMBODIMENTS

The new crystalline silicates which have the property of catalyzing the above-mentioned conversions have the following characteristics:
(a) they are thermally stable to temperatures above 600° C.,
(b) after dehydration at 400° C. in vacuum, they are capable of adsorbing more than 3%w water at 25° C. and saturated water vapor pressure, and
(c) in dehydrated form, has the following overall composition, expressed in moles of the oxides:
$(1.0\pm0.3)(R)_{2/n}O.[a\ Fe_2O_3.b.Al_2O_3.cGa_2O_3]. y(d\ SiO_2.eGeO_2)$, where:
R = one or more mono or bivalent cations,
$a \geq 0.1$,
$b \geq 0$,
$c \geq 0$,
$a+b+c=1$,
$y \geq 10$,
$d \geq 0.1$,
$e \geq 0$, d+e=1, and n=the valency of R.

For the sake of brevity, catalysts containing a crystalline silicate as defined above will in this patent application from now on be designated "catalysts according to the invention".

The process according to the invention is preferably carried out at a temperature of 200° to 500° C., a pressure below 100 bar and a space velocity of 0.1 to 50 $1.1^{-1}.h^{-1}$.

The light and heavy fractions herein may be separated from the Fischer-Tropsch hydrocarbon synthesis product by any known method for separating components according to boiling range such as a fractionation distillation, flashing, phase separation, and the like, at atmospheric, subatmospheric, or superatmospheric pressure as may be appropriate.

As light fractions that can be used as the starting material for the preparation of aromatic gasoline according to the invention, all fractions and mixtures of fractions which can be separated from the Fischer-Tropsch reaction product and which consist substantially of components boiling in and/or below the gasoline range are, in principle, eligible. Light fractions that may be used include both fractions which consist substantially of gaseous components and fractions which consist substantially of liquid components.

Very suitable light fractions which consist substantially of gaseous components of a Fischer-Tropsch reaction product are gaseous fractions which are rich in $C_2$ to $C_5$ hydrocarbons which can be separated from the gas phase of a Fischer-Tropsch reaction product and such fractions from which $C_3$ and $C_4$ hydrocarbons have been removed. If the starting material chosen for the preparation of aromatic gasoline is a light fraction which consists substantially of gaseous components, the process is preferably carried out at a temperature of 350° to 500° C.

Very suitable light fractions which consist substantially of liquid components of a Fischer-Tropsch reaction product are:

(a) gasoline fractions with a final boiling point between 150° and 200° C.;

(b) light oil fractions consisting of liquid components which boil substantially below 300° C.;

(c) mixtures of oxygen-containing hydrocarbons which may be separated from the aqueous phase obtained in the working up of a Fischer-Tropsch reaction product; and (d) mixtures of oxygen-containing hydrocarbons which may be separated from the light oil fractions mentioned under (b) by washing with water.

If the starting material chosen for the preparation of aromatic gasoline is a light fraction which consists substantially of liquid components, the process is preferably carried out at a temperature of 325° to 425° C.

Very suitable light fractions are also fractions which contain both gaseous and liquid components of a Fischer-Tropsch reaction product. Examples of such fractions are:

(a) fractions boiling substantially below 200° C., and (b) mixtures of:

(i) gaseous fractions rich in $C_2$ to $C_5$ hydrocarbons which can be separated from the gasphase of a Fischer-Tropsch reaction product and such fractions from which $C_3$ and $C_4$ hydrocarbons have been removed with (ii) gasoline fractions with a final boiling point between 150° and 200° C. or light oil fractions consisting of liquid components which boil substantially below 300° C., e.g., below about 250° C.

Heavy fractions which are, in principle, eligible for use as the starting material for the preparation of fuel with a low pour point according to the invention include all fractions and mixtures of fractions which can be separated from the Fischer-Tropsch reaction product and which boil substantially above the gasoline range.

Very suitable fractions which consist substantially of components boiling above the gasoline range are:

(a) fractions boiling substantially above 200° C., in particular, such fractions after they have been subjected to a catalytic hydrotreatment;

(b) fractions with an initial boiling point between 300° and 350° C. and preferably a final boiling point below 450° C.;

(c) a mixture of two distillate fractions of a product obtained in the catalytic hydrotreatment of a fraction with an initial boiling point between 150° and 200° C. separated from a Fischer-Tropsch reaction product, one component of the mixture being a fraction with an initial boiling point between 300° and 350° C. and the other component a fraction with an initial boiling point between 300° and 350° C. Particularly suitable, for instance, is a mixture of a fraction with an initial boiling point of about 350° C. and either a fraction with a boiling range of about 175° to 300° C. or a fraction with a boiling range of about 250° to 350° C.

If the process according to the invention is used for the preparation of a fuel with a low pour point from a heavy fraction of a Fischer-Tropsch reaction product, the process is preferably carried out at a temperature of 200° to 350° C.

The process according to the invention is started from a Fischer-Tropsch reaction product. Such reaction products are obtained by contacting a mixture of carbon monoxide and hydrogen (the so-called synthesis gas) at an elevated temperature and a pressure with a suitable catalyst. As a rule, these catalyst contain one or more metals from the iron group or ruthenium together with one or more promoters to increase the activity and/or selectivity and sometimes a carrier material such as kieselguhr.

The preparation of the synthesis gas required for the hydrocarbon synthesis according to Fischer-Tropsch is preferably effected by gasification of coal or liquid mineral oil fractions or is started from natural gas by catalytic steam reforming or partial oxidation.

In certain cases, it is preferred to carry out the process according to the invention in the presence of hydrogen and/or with the use of a catalyst according to the invention which contains one or more metal components with hydrogenation activity estimated from Group VI and Group VIII and particularly nickel. In certain cases, it is further preferred in the process, according to the invention, to give the fraction that is contacted with the catalyst, according to the invention, a catalytic pretreatment with hydrogen.

In the conversion of liquid fractions of a Fischer-Tropsch reaction product in presence of a catalyst, according to the invention, in presence of a catalyst, according to the invention, a mixture of $C_3$ and $C_4$ hydrocarbons is formed as a byproduct which consists substantially of isobutane. By using this mixture of $C_3$ and $C_4$ hydrocarbons in an alkylation process, an additional amount of gasoline can be prepared in the process according to the invention. Further, a $C_3/C_4$ fraction separated from the gaseous part of the Fischer-Tropsch reaction product may conveniently be used in the process according to the invention for the preparation of gasoline by catalytic polymerization.

In the process, according to the invention, use is made of a catalyst which contains a crystalline silicate of a special class. These silicates effect a high conversion of aliphatic hydrocarbons in commercially desired yields and they are in general very active in conversions involving aromatic hydrocarbons.

In the process, according to the invention, it is preferred to use silicates in which no gallium and germanium are present. In other words, silicates of which in the above-mentioned overall composition, c and e are 0. Such silicates are the subject of Netherlands patent application No. 7,613,957. Further, it is preferred to use silicates of which, in the above-mentioned overall composition, a is greater than 0.5. Particularly preferred silicates are those in which no aluminum is present. In other words, silicates of which in the above-mentioned overall composition, b is 0. It should be noted that in the silicates used in the process according to the invention, y is preferably less than 800, and in particular, less than 600. Finally, it is preferred in the process according to the invention to use silicates whose x-ray powder diffraction pattern has, inter alia, the reflections given in Table A of Netherlands patent application No. 7,613,957.

Some attractive embodiments of the process according to the invention will be further explained below:

(a) A Fischer-Tropsch reaction product is separated into a light fraction which boils substantially below 200° C. and a heavy fraction which boils substantially above 200° C. The light fraction is contacted at an elevated temperature with a catalyst, according to the invention, and an aromatic gasoline is separated from the reaction product. The heavy fraction is contacted at an elevated temperature and in the presence of hydrogen with a catalyst according to the invention and, in addition to a gasoline, a fuel with a low pour point is separated from the reaction product. In this process, it is preferred to apply a catalytic hydrotreatment to the heavy fraction before it is contacted with the catalyst according to the invention.

(b) From a Fischer-Tropsch reaction product, a gasoline fraction with a final boiling point between 150° and 200° C. and a heavy oil fraction with an initial boiling point between 300° and 350° C. are separated. The gasoline fraction is contacted at an elevated temperature with a catalyst according to the invention and an aromatic gasoline is separated from the reaction product. The heavy oil fraction is contacted at an elevated temperature and in the presence of hydrogen with a catalyst according to the invention and, in addition to a gasoline, a fuel with a low pour point is separated from the reaction product. In this process, it is preferred to apply a catalytic hydrotreatment to a mixture of the low pour point fuel obtained and a light oil fraction which has been separated from the Fischer-Tropsch reaction product and which light oil fraction has an initial boiling point between 150° and 200° C. and a final boiling point between 300° and 350° C.

(c) From a Fischer-Tropsch reaction product, a gaseous hydrocarbon fraction and a gasoline fraction with a final boiling point between 150° and 200° C. are separated and these fractions are together contacted at an elevated temperature with a catalyst according to the invention. An aromatic gasoline is separated from the reaction product. This process is preferably extended as follows: from the Fischer-Tropsch reaction product, a light oil fraction with an initial boiling point between 150° and 200° C. and a final boiling point between 300° and 350° C. and a heavy oil fraction with an initial boiling point between 300° and 350° C. are also separated. The light oil fraction is subjected to a catalytic hydrotreatment and from the reaction product, a light fraction with a final boiling point between 150° and 200° C. is separated. This light fraction is mixed with the reaction product obtained in the conversion in presence of the catalyst according to the invention. An aromatic gasoline and a fraction heavier than gasoline are separated from the mixture. The fraction heavier than gasoline is subjected to the catalytic hydrotreatment. In this process, it is preferred to prepare a fuel with a low pour point from the heavy oil fraction with an initial boiling point between 300° and 350° C. by contacting it at an elevated temperature with a catalyst according to the invention.

(d) From a Fischer-Tropsch reaction product, the first heavy fraction with an initial boiling point between 150° and 200° C. is separated and this fraction is subjected to a catalytic hydrotreatment. From the reaction product, a middle fraction with an initial boiling point between 150° and 200° C. and a final boiling point between 300° and 350° C. and the second heavy fraction with an initial boiling point between 300° and 350° C. are separated. The second heavy fraction, together with at least part of the middle fraction, is contacted at an elevated temperature and in the presence of hydrogen with a catalyst according to the invention and, in addition to a gasoline, a fuel with low pour is separated from the reaction product. If in the process only part of the middle fraction is mixed with the second heavy fraction, that part may consist of either one of the portions obtained by separating the middle fraction into two portions of the same composition or of a distillate fraction of the middle fraction. If the reaction product of the catalytic hydrotreatment has been separated into, for instance, a light fraction with a final boiling point of about 175° C., a middle fraction with a boiling range of about 175° to 350° C., and a heavy fraction with an initial boiling point of about 350° C., this heavy fraction may very conveniently be mixed with a 175° to 300° C. fraction or with a 250° to 350° C. fraction of the middle fraction. In this process, the hydrogen that is used in the preparation of the low pour point fuel in presence of the catalyst, according to the invention, should preferably originate at least in part from the reaction product that is obtained in the catalytic hydrotreatment of the heavy fraction from the Fischer-Tropsch reaction product. In this process, it is further preferred to convert the light fraction which may be separated from the Fischer-Tropsch product into aromatic gasoline by contacting it at an elevated temperature with a catalyst according to the invention.

(e) From a Fischer-Tropsch reaction product four fractions are separated: a gaseous fraction which comprises oxygen-containing hydrocarbons, a light oil fraction boiling substantially below 300° C. which comprises, in addition to hydrocarbons, oxygen-containing hydrocarbons and a heavy oil fraction boiling substantially above 300° C. The gaseous fraction and the light oil fraction are contacted separately or together at an elevated temperature with a catalyst according to the invention. From the reaction product, an aromatic gasoline and a fraction heavier than gasoline are separated from the light oil fraction by washing with water. Instead of the complete light oil fraction, it is also possible to subject a gasoline fraction separated from it by distillation to the conversion in presence of the catalyst according to the invention. Instead of the complete gaseous fraction, it is also possible to subject a gaseous fraction from which $C_4$-components have been removed, to the conversion in presence of the catalyst according to the invention. The yield of aromatic gasoline can still be increased by contacting the oxygen-containing hydrocarbons present in the aqueous fraction at an elevated temperature with a catalyst according to the invention. Together with these oxygen-containing hydrocarbons, oxygen-containing hydrocarbons which may be separated from the light oil fraction, can also be converted into aromatic gasoline. In this process, a fuel with a low pour point is preferably prepared from the heavy oil fraction which boils substantially above 300° C. by contacting the latter at an elevated temperature with a catalyst according to the invention.

The crystalline silicates which are used as the catalyst in the process according to the invention are usually prepared from an aqueous mixture as the base material which contains the following compounds in a certan ratio: one or more compounds of an alkali metal; one or more compounds comprising an organic cation or from which such a cation is formed during the preparation of the silicate; one or more silicon compounds; one or more iron compounds; and optionally, one or more aluminum, gallium, and/or germanium compounds. The preparation is carried out by maintaining the mixture at an elevated temperature until the silicate has been formed and then separating the crystals of the silicate from the mother liquor. Before being used in the process according to the invention, the organic cations which have been introduced during the preparation should be converted by calcining into hydrogen ions. It is preferred to use in the process silicate whose alkali metal content is less than 1%w and particularly less than 0.05%w. Such silicates can be prepared from the above-mentioned calcined silicates by ion exchange, for instance, with an aqueous solution of an ammonium salt followed by calcining.

The invention will now be explained with reference to the following example.

EXAMPLE

A crystalline iron silicate (silicate A) was prepared as follows: A mixture of $Fe(NO_3)_3$, $SiO_2$, $NaNO_3$, and $\&(C_3H_7)_4N^*OH$ in water with the molar composition $Na_2O.1.5\&(C_3H_7)_4N^*_2O.0.125$ $Fe_2O_3$. 25 $SiO_2$. 468 $H_2O$ was heated for 48 hours in an autoclave at 150° C. under autogenous pressure. After the reaction mixture had cooled down, the silicate formed was filtered off, washed with water until the pH of the wash water was about 8, and dried for two hours at 120° C. Silicate A, thus prepared, had the following chemical composition: $0.8\&(C_3H_7)_4^*_2O$. $0.3Na_2O_3.Fe_2O_3.200$ $SiO_2.55$ $H_2O$. The silicate had an x-ray powder diffraction pattern substantially as given in Table B of Netherlands patent application No. 7,613,957. The silicate was thermally stable to temperatures higher than 900° C. and was capable, after dehydration at 400° C., of adsorbing in vacuum 7%w water at 25° C. and saturated water vapor pressure. With silicate A as the starting material, silicate B was prepared by successively calcining silicate A at 500° C., boiling with 1.0 molar $NH_4NO_3$ solution, washing with water, boiling again with 1.0 molar $NH_4NO_3$ solution and washing, drying at 120° C., and calcining at 500° C.

From the liquid part of the reaction product obtained by contacting a mixture of carbon monoxide and hydrogen at an elevated temperature and pressure with an iron-containing Fischer-Tropsch catalyst, water was separated and from the remaining organic liquid, a 200° C.− light distillate fraction and a 250° C.+ heavy residue fraction were isolated by distillation. The 200° C.− fraction which consisted of 16.3%m alcohols, 63.3%m olefins, and 20.4%m paraffins was contacted with silicate B at a temperature of 375° C., a total pressure of 3 bar and a space velocity of 1 liter per liter per hour. From the reaction product thus obtained, a $C_5+$ gasoline fraction was separated in a yield of 70.7%w which consisted of 62.2%w paraffins, 19.2%w aromatics, and 18.6%w naphthenes. The 250° C.+ fraction whose pour point was 31° C. was contacted with silicate B at a temperature of 300° C., a total pressure of 3 bar and a space velocity of 1 liter per liter per hour. From the reaction product thus obtained, a $C_5-200°$ C. gasoline fraction and a 250° C.+ residual fraction with a pour point of 22° C. were separated. The gasoline and fuel oil yields based on the 250° C.+ fraction with pour point 31° C. feed material were 10.1 and 83.4%w, respectively.

What is claimed is:

1. A process for upgrading a Fischer-Tropsch hydrocarbon synthesis reaction product which comprises:

Separating from said reaction product at least:
 (a) a light fraction consisting substantially of gaseous and/or liquid components boiling at a temperature below about 250° C., and
 (b) a heavy fraction, a major portion of which has an atmospheric boiling point above 200° C.; and Contacting at least one of said light and heavy fractions at a temperature in the range from about 200° to about 550° C., a pressure below 100 bar and a space velocity in the range from about 0.1 to about 50 liters per liter per hour with a catalyst containing a crystalline silicate which (i) is thermally stable to temperatures above 600° C.,
 (ii) after dehydration at 400° C. in vacuum, is capable of adsorbing more than 3%w water at 25° C. and saturated water vapor pressure, and
 (iii) in dehydrated form, has the following overall composition, expressed in moles of the oxides:

$(1.0\pm0.3)$ $(R)_{2/n}O.[a\ Fe_2O_3.b.Al_2O_3.cGa_2O_3]$. $y(d\ SiO_2.eGeO_2O)$, where:
  R = one or more mono or bivalent cations, $a > 0.5$
$b \geq 0$
$c \geq 0$,
$a+b+c=1$,
$y=10-600$,
$d \geq 0.1$,
$e \geq 0$,
$d+e=1$, and
$n=$ the valency of R, whereby in the case of said light, an aromatic gasoline product is obtained and in the case of said heavy fraction, a fuel oil product having a lower pour point than that of said heavy fraction is obtained.

2. A process according to claim 1 wherein the light fraction consists substantially of gaseous components and is contacted with the catalyst at a temperature in the range of 350° to 500° C.

3. A process according to claim 1 wherein the light fraction is contacted with the catalyst at a temperature in the range of 325° to 425° C.

4. A process according to claim 1 wherein the heavy fraction is contacted with the catalyst at a temperature in the range of 200° to 350° C.

5. A process according to claim 1 wherein the catalyst contains a crystalline silicate of which c and e are equal to 0 in the formula which gives the overall composition.

6. A process as in claim 1 which comprises the further step of fractionating the product from contacting said light and/or heavy fraction with said crystalline silicate catalyst to separate a mixture of $C_3$ to $C_4$ hydrocarbons consisting substantially of isobutane, reacting said mixture of $C_3$ and $C_4$ hydrocarbons with a new source of $C_3$ to $C_5$ olefins to obtain an alkylation product and combining at least part of said alkylation product with the aromatic gasoline product of claim 1.

7. A process according to claim 1 wherein contacting of at least one said fraction with the catalyst containing crystalline silicate is carried out in the presence of added hydrogen.

8. A process according to claim 1 wherein the catalyst which contains the crystalline silicate contains, in addition, one or more metal components with hydrogenation activity.

* * * * *